US007979417B1

(12) United States Patent
Bharat et al.

(10) Patent No.: US 7,979,417 B1
(45) Date of Patent: Jul. 12, 2011

(54) EMBEDDED COMMUNICATION OF LINK INFORMATION

(75) Inventors: Krishna Bharat, San Jose, CA (US); Matthew Daniel Cutts, Mountain View, CA (US); Paul G. Haahr, San Francisco, CA (US); Radhika A. Malpani, Palo Alto, CA (US); Vibhu Mittal, Sunnyvale, CA (US); Marcin Kaszkiel, Delahey (AU)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 11/172,701

(22) Filed: Jun. 30, 2005

(51) Int. Cl.
*G06F 7/00* (2006.01)
*G06F 17/30* (2006.01)

(52) U.S. Cl. ........................ 707/709; 707/711
(58) Field of Classification Search .................. 707/706, 707/709, 711
See application file for complete search history.

(56) References Cited

U.S. PATENT DOCUMENTS

| | | | | |
|---|---|---|---|---|
| 5,826,267 A * | 10/1998 | McMillan | | 707/9 |
| 6,055,569 A * | 4/2000 | O'Brien et al. | | 709/223 |
| 6,145,003 A * | 11/2000 | Sanu et al. | | 709/225 |
| 6,285,999 B1 * | 9/2001 | Page | | 707/5 |
| 6,286,006 B1 * | 9/2001 | Bharat et al. | | 707/100 |
| 6,331,865 B1 * | 12/2001 | Sachs et al. | | 715/776 |
| 6,526,440 B1 * | 2/2003 | Bharat | | 709/219 |
| 6,735,585 B1 * | 5/2004 | Black et al. | | 707/3 |
| 6,947,557 B1 * | 9/2005 | Megiddo et al. | | 380/30 |
| 7,080,073 B1 * | 7/2006 | Jiang et al. | | 707/7 |
| 7,082,476 B1 * | 7/2006 | Cohen et al. | | 709/246 |
| 7,275,086 B1 * | 9/2007 | Bodnar | | 709/218 |
| 2002/0069222 A1 * | 6/2002 | McNeely | | 707/513 |
| 2004/0054654 A1 * | 3/2004 | Nomiyama et al. | | 707/1 |
| 2005/0120292 A1 * | 6/2005 | Suzuki | | 715/501.1 |
| 2005/0149851 A1 * | 7/2005 | Mittal | | 715/501.1 |
| 2005/0222953 A1 * | 10/2005 | Ganesan et al. | | 705/40 |
| 2006/0005113 A1 * | 1/2006 | Baluja et al. | | 715/501.1 |
| 2006/0030292 A1 * | 2/2006 | Bosworth et al. | | 455/408 |
| 2006/0085447 A1 * | 4/2006 | D'Urso | | 707/100 |

FOREIGN PATENT DOCUMENTS

GB 2368167 A * 4/2002
WO WO 00/43918 * 7/2000

* cited by examiner

*Primary Examiner* — Kuen S Lu
*Assistant Examiner* — Hexing Liu
(74) *Attorney, Agent, or Firm* — Morgan, Lewis & Bockius LLP

(57) ABSTRACT

A method of processing documents is described. The method includes the operation of receiving a document in a search engine crawler. The document includes an embedded first link tag. The first link tag includes one or more information pairs. A respective information pair includes a respective parameter and a corresponding value. The parameters in the one or more information pairs may correspond to content at one or more content locations or one or more document locations. The method also includes selecting a method of processing content associated with the first link tag in accordance with one or more of the information pairs.

21 Claims, 11 Drawing Sheets

EMBEDDED COMMUNICATION OF LINK INFORMATION

FIELD OF THE INVENTION

The present invention relates generally to search engines, such as Internet and Intranet search engines, and more specifically to processing content based on link information in anchor tags.

BACKGROUND

Search engines provide a powerful tool for locating content in documents in large database of documents, such as the documents on the Internet or World Wide Web (WWW), or the documents stored on the computers of an Intranet. The documents are located by searching an index of documents in response to a search query submitted by a user. The query has one or more words, terms, keywords and/or phrases. The document index is generated by scanning the documents using one or more network crawlers (or web crawlers). When the number of documents to be indexed is large (e.g., billions of documents), accomplishing such scanning in a timely manner usually involves multiple crawlers operating in parallel.

During the scanning of documents by one or more crawlers, additional content or documents may be discovered based on links to such additional content or documents embedded in the documents that are scanned. One existing approach to providing links to additional content or documents is in the form of anchor tags. In hypertext documents, anchor tags may include links to other documents or to other parts of the same document. The existing anchor tags, however, have several limitations. Notably, the information in the anchor tags only convey content or document locations. The anchor tags do not convey opinions about the content or documents referenced by the anchor tags. In general, anchor tags also have not been used to convey weighting of a relative importance of the locations referenced by the anchor tags. And the information in existing anchor tags is public. There is no mechanism to secure the information in an anchor tag such that it may only be viewed by a restricted audience. There is a need, therefore, for improved anchor tags for use by search engines.

SUMMARY

A method of processing documents is described. The method includes the operation of receiving a document in a search engine crawler. The document includes an embedded first link tag. The first link tag includes one or more information pairs. A respective information pair includes a respective parameter and a corresponding value. The parameters in the one or more information pairs may correspond to content at one or more content locations or one or more document locations. The method also includes selecting a method of processing content associated with the first link tag in accordance with one or more of the information pairs.

The first link tag may be hypertext markup language (HTML) and/or extensible markup language (XML) compatible. An information pair of the one or more information pairs included in the first link tag may be included in a second tag having an extent that includes the first link tag. The second tag may include a second information pair having a respective parameter and a corresponding second value. When content associated with the first link is processed, it may be processed in accordance with the second value.

The selected method of processing content may include blocking processing of the content associated with the first link tag. The selected method of processing content may include adjusting a weight associated with the first link tag.

In some embodiments, the method of processing documents may include computing one or more document ranking values for the one or more document locations. The computing may be performed in accordance with the weight associated with the first link tag. In some embodiments, the link tag may be associated with the one or more content locations and the method of processing documents may include computing the one or more document ranking values for the one or more content locations in accordance with the weight associated with the first link tag.

One or more of the values in the one or more information pairs may be encrypted. In some embodiments, the one or more encrypted values are encrypted using a key from a non-symmetric key pair. The method of processing documents may include retrieving a respective decryption key associated with a respective publisher. In some embodiments, the retrieving may include looking up the respective decryption key in a data structure in accordance with a location of the received document. In some embodiments, the retrieving may include looking up the respective decryption key in a data structure in accordance with an identifier of the received document.

A method of generating and embedding a link tag in the document is also described.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Improved anchor tags embedded in documents are described. The anchor tags are henceforth referred to as link tags. A given link tag in a document may correspond to content at one or more content locations or one or more document locations. The one or more content locations may be in the same document and/or in other documents. The one or more documents locations may correspond to one or more web sites and/or one or more web pages. The one or more document locations may include one or more uniform resource locators (URLs). The one or more document locations may be on an Intranet and/or the Internet, which is also referred to as the World Wide Web (WWW).

Information in the improved link tags may allow one or more publishers of content and/or documents to convey opinions about content and/or documents at the one or more content locations and/or the one or more document locations. The link tags may also allow the one or more publishers to convey a weighting of a relative importance of the one or more content locations and/or the one or more document locations. In some embodiments, at least a portion of the information in the improved link tags may be encrypted, to allow the one or more publishers to restrict the audience that may view the information in the link tags.

The information in the link tags may be used by one or more web crawlers and/or search engines to determine how to process the content and/or documents associated with the link tags. In the discussion that follows, improved link tags for use with hypertext markup language (HTML) and/or extensible markup language (XML) are described. It is understood, however, that the improved link tags embedded in one or more documents may be implemented using and compatible with a wide variety of markup languages.

Figure 1A:
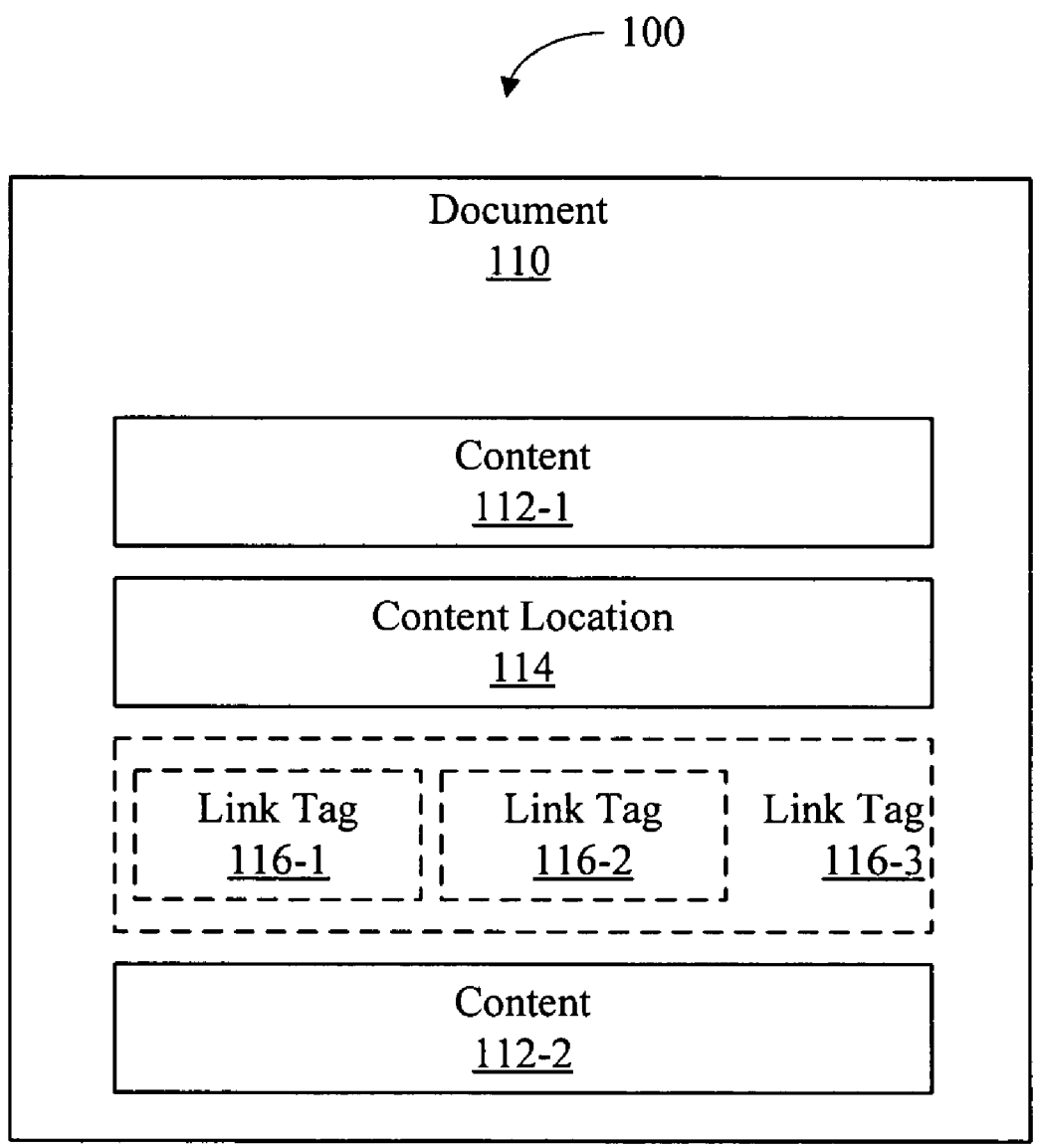
FIG. 1A is a block diagram illustrating an embodiment of a document.

FIG. 1A illustrates an embodiment 100 of a document 110. The document 110 includes content 112, content location 114 and informational tags, such as link tags 116. The content location 114 may be a hypertext link in HTML. In the document 110, link tags 116-1 and 116-2 are embedded in link tag 116-3.

Existing link tags in HTML have several formats. For a link to another document (a "referenced document") that is at a local location on the network, a link tag including part of the URL of the referenced document, known as a relative URL, may be included in the document 110. For example, <A HREF="./links.html">another document</A>.

For a document that is not at a local location, a link tag including the full URL of the referenced document may be included in the document 110. For example, <A HREF="htp://www.interesting.com/documents/links.html">another document</A>.

In addition, existing link tags may create links to content, such as content 112-1, at different content locations in the document 110. For example, <A HREF="section">section heading</A>.

In this case, at an appropriate location the document 110 also includes a link tag corresponding to "section", such as <A NAME="section">.

As illustrated in FIG. 1A, the document 110 may include multiple link tags 116. When a link tag, such as link tag 116-1 is activated, a user is taken to the content or document location associated with the link tag.

While the existing link tags are useful, the limited information contained in them may pose a challenge. Web crawlers and related search engines, for example, are not provided with additional information that may be useful in determining a relative importance or weighting for one or more content locations and/or document locations associated with one or more link tags. This may make the determination of a score for the one or more content locations and/or the one or more document locations in response to a search query from a user more difficult. The improved linked tags described below allow publishers of content and/or documents to embed additional information in the link tags. In an exemplary embodiment, the improved link tags are compatible with HTML and/or XML, thereby avoiding disruption of and providing backward compatibility to the existing infrastructure. The improved link tags may allow the publishers to communicate additional information, such as opinions, about the content locations and/or document locations. The additional information may be along one or more dimensions. Therefore, different information may be conveyed at the same time. For example, one dimension may indicate that a content location and/or a document location is offensive as well as funny.

In another example, the improved link tags may allow publishers to convey weighting information, either directly or indirectly, about the relative importance of the one or more content locations and/or the one or more document locations using the one or more link tags. For instance, a link tag may specify that a link to a first referenced document is to be given half (0.5 times) the normal weight of a normal link to the reference document. Another link tag may specify that a link to a second referenced document is to be given no weight whatsoever when determining a score for the second referenced document's (e.g., the page rank of the referenced document).

Figure 1B:
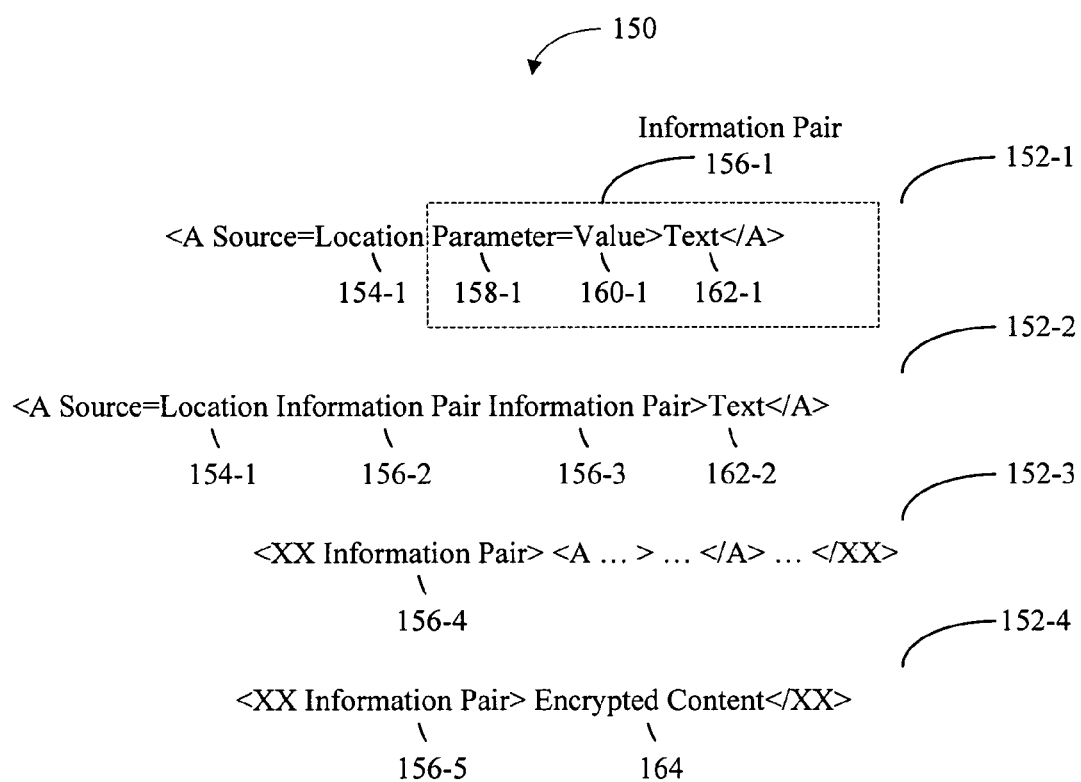
FIG. 1B is a block diagram illustrating an embodiment of several link tags.

FIG. 1B illustrates an embodiment 150 of several improved link tags 152. The link tags 152 include one or more information pairs 156. With the exception of link tag 152-4, the remainder of the link tags 152 are compatible with existing link tag formats, including locations 154 and text 162. Each information pair includes a parameter, such as parameter 158-1 and a corresponding value, such as value 160-1. The parameter 158-1 defines a dimension for the additional information in link tag 152-1 and the value 160-1 corresponds to the additional information. For example, "offensive=very"

or

"funny=somewhat."

While the parameter and values in these examples are text, the set of parameters and the values may include numbers and/or text. For example, a link tag may include a pair such as "linkweight=0.5" to specify a link weight for the link represented by the link tag.

Link tags 152-3 and 152-4 illustrate link tags that are XML compatible. Link tag 152-4 also illustrates encrypted content 164. This may be useful in embodiments where the publisher of content and/or documents, such as the document 110 (FIG. 1A), may wish to restrict the audience that is allowed to view at least some of the information in the link tags. HTML compatible link tags, such as the link tag 152-1, may also include encrypted content. In addition, in some embodiments, the values, such as the value 160-1, in one or more of the link tags 152 may be encrypted.

In an exemplary embodiment, encryption of content, such as the encrypted content 164, and/or values, such as the value 160-1, may use a key from a non-symmetric key pair, such as public key infrastructure (PKI) or pretty good privacy (PGP) public-key encryption. Other embodiments may use nonce-based encryption, where padding, such as a pseudo-random sequence, is added prior to encryption.

The information in one or more of the information pairs 156 may be used to select processing of content and/or documents associated with one or more of the link tags 152. In an exemplary embodiment, the processing may include blocking processing of content and/or documents associated with one or more link tags 152. The information may be used to change one or more weights and/or one or more rank values corresponding to one or more content locations and/or document locations associated with one or more of the link tags 152. The changing of the one or more weights and/or the one or more rank values may be implemented by a web crawler that receives a document, such as the document 110 (FIG. 1A), containing one or more link tags 152. The one or more changed weights and/or the one or more rank values may be used by a search engine to compute one or more scores corresponding to the one or more content locations and/or document locations. The one or more changed weights and/or the one or more rank values may also be used in parsing of terms or information in a search query.

As shown in FIG. 1A, document markup tags, including the improved link tags, may be nested or embedded within other tags that include information pairs. In particular, a first link tag 116-1 having a first informational pair may be embedded or nested within a second tag 116-3 that has a second informational pair having a respective parameter and a corresponding second value. In some embodiments, when content associated with the first link is processed, it is processed in accordance with the second value (found in the second tag 116-3). The second tag (in which the first link tag is embedded) may be a link tag, or other type of document markup tag.

Figure 2A:
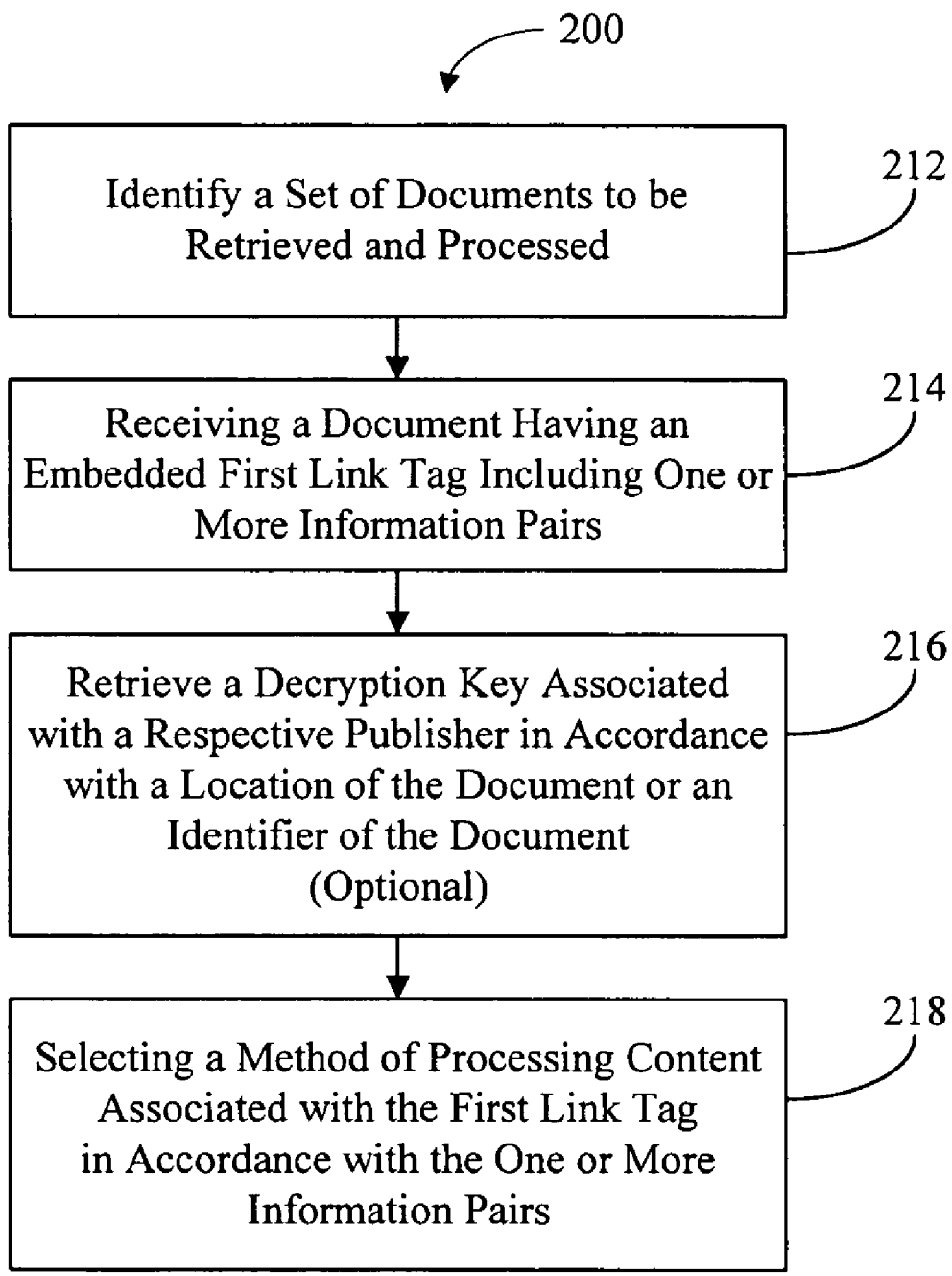
FIG. 2A is a flow diagram illustrating an embodiment of a method of using link tags.

FIG. 2A illustrates an embodiment of a method of using link tags 200. A set of documents to be retrieved and processed is identified (212). A document having an embedded first link tag including one or more information pairs is received (214). In some embodiments, a decryption key associated with a respective publisher is retrieved in accordance with a location of the document or an identifier of the document (216). The identifier of the document may enable a computer retrieving or processing the document to look up additional information corresponding to the document, including one or more cookies. A method of processing content associated with the first link tag is selected in accordance with the one or more information pairs (218). The method 200 may include fewer operations or additional operations. In addition, two or more operations may be combined and/or an order of the operations may be changed.

Figure 2B:
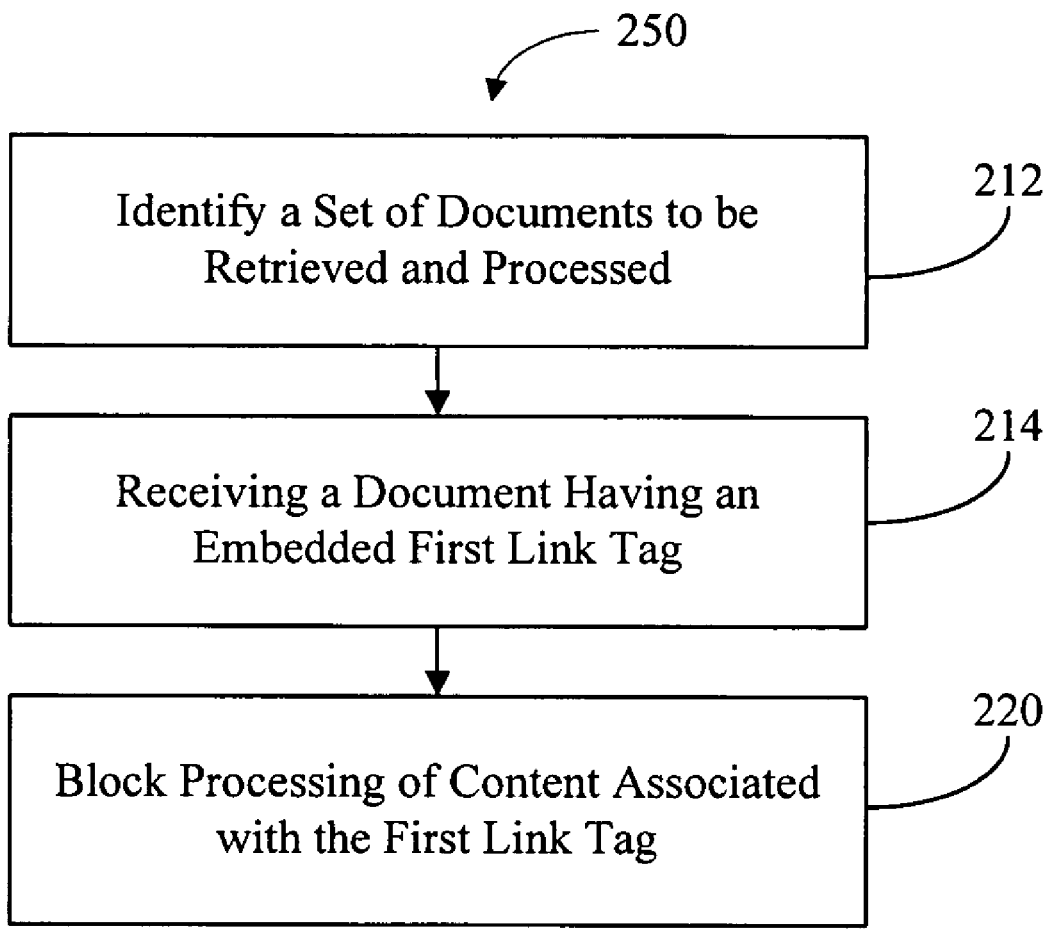
FIG. 2B is a flow diagram illustrating an embodiment of a method of using link tags.

FIG. 2B illustrates an embodiment of a method of using link tags 250. The set of documents to be retrieved and processed is identified (212). The document having an embedded first link tag including one or more information pairs is received (214). In accordance with a value of an information pair in the first link tag (or in accordance with values of the two or more of the information pairs in the first link tag), processing of content associated with the first link tag is blocked (220). The method 250 may include fewer operations or additional operations. In addition, two or more operations may be combined and/or the order of the operations may be changed.

Figure 2C:
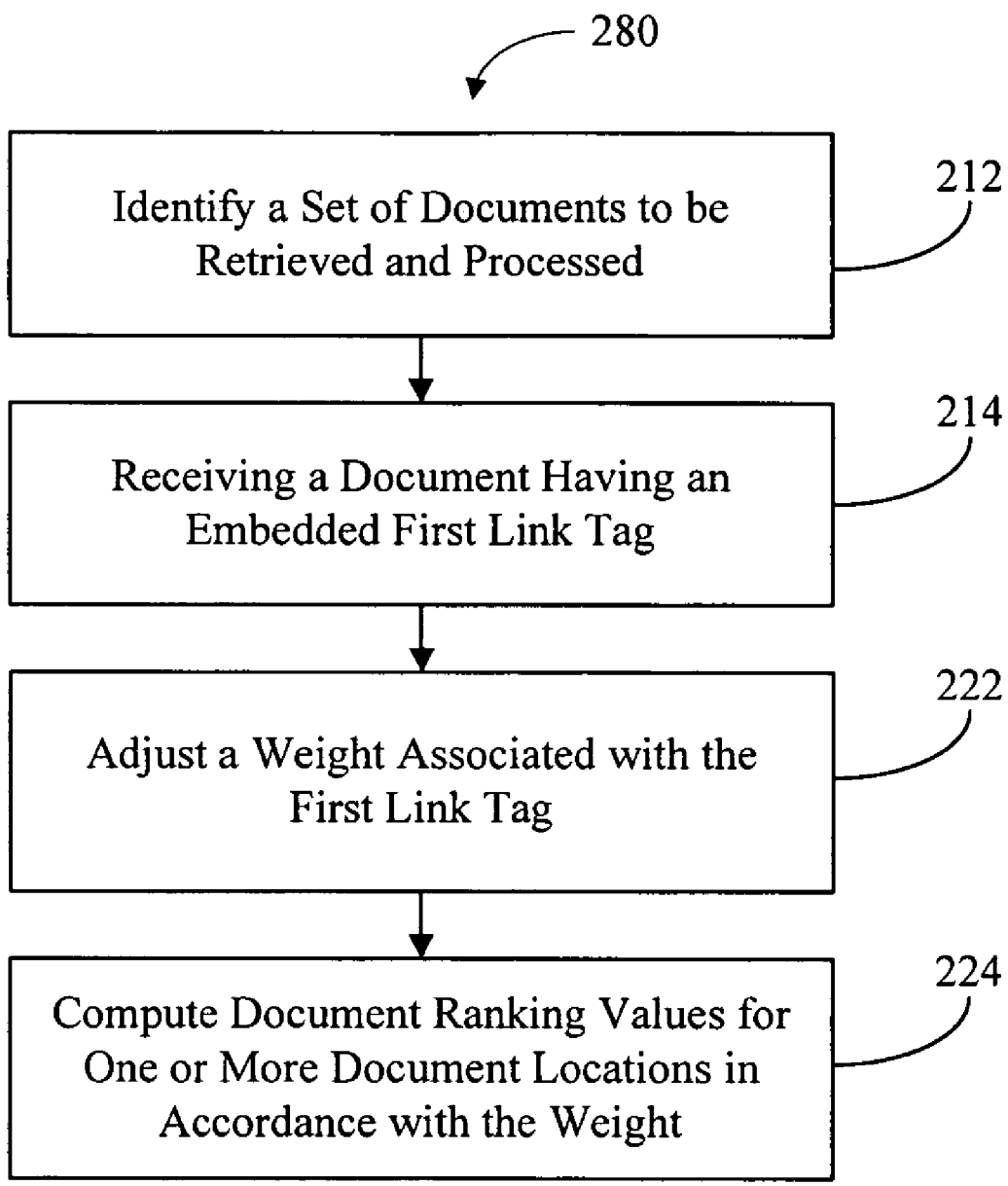
FIG. 2C is a flow diagram illustrating an embodiment of a method of using link tags.

FIG. 2C illustrates an embodiment of a method of using link tags 280. The set of documents to be retrieved and processed is identified (212). The document having an embedded first link tag including one or more information pairs is received (214). In accordance with a value of an information pair in the first link tag (or in accordance with values of the two or more of the information pairs in the first link tag), a weight associated with the first link tag is adjusted (222). Document ranking values for one or more documents locations are computed in accordance with the weight (224). The method 280 may include fewer operations or additional operations. In addition, two or more operations may be combined and/or the order of the operations may be changed.

Figure 3:
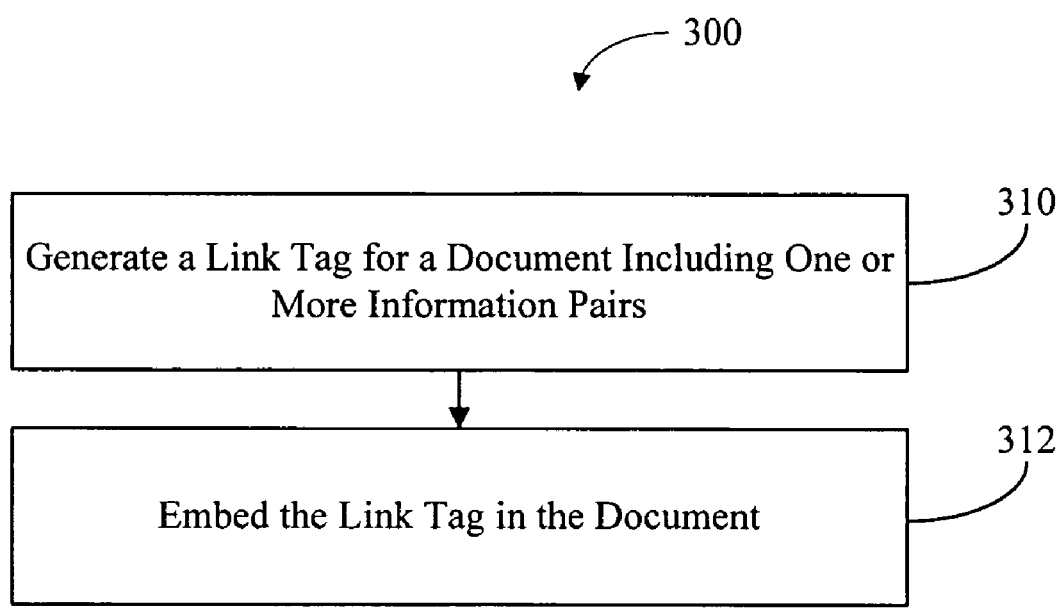
FIG. 3 is a flow diagram illustrating an embodiment of a method of generating one or more link tags in a documents.

The improved link tags may be implemented using authoring tools used by publishers of content and/or documents. FIG. 3 illustrates an embodiment of a method of generating one or more link tags in a document 300. A link tag for a document, including one or more information pairs, is generated (310). The link tag is embedded in the document (312). The method 300 may include fewer operations or additional operations. In addition, two or more operations may be combined and/or the order of the operations may be changed.

Figure 4:
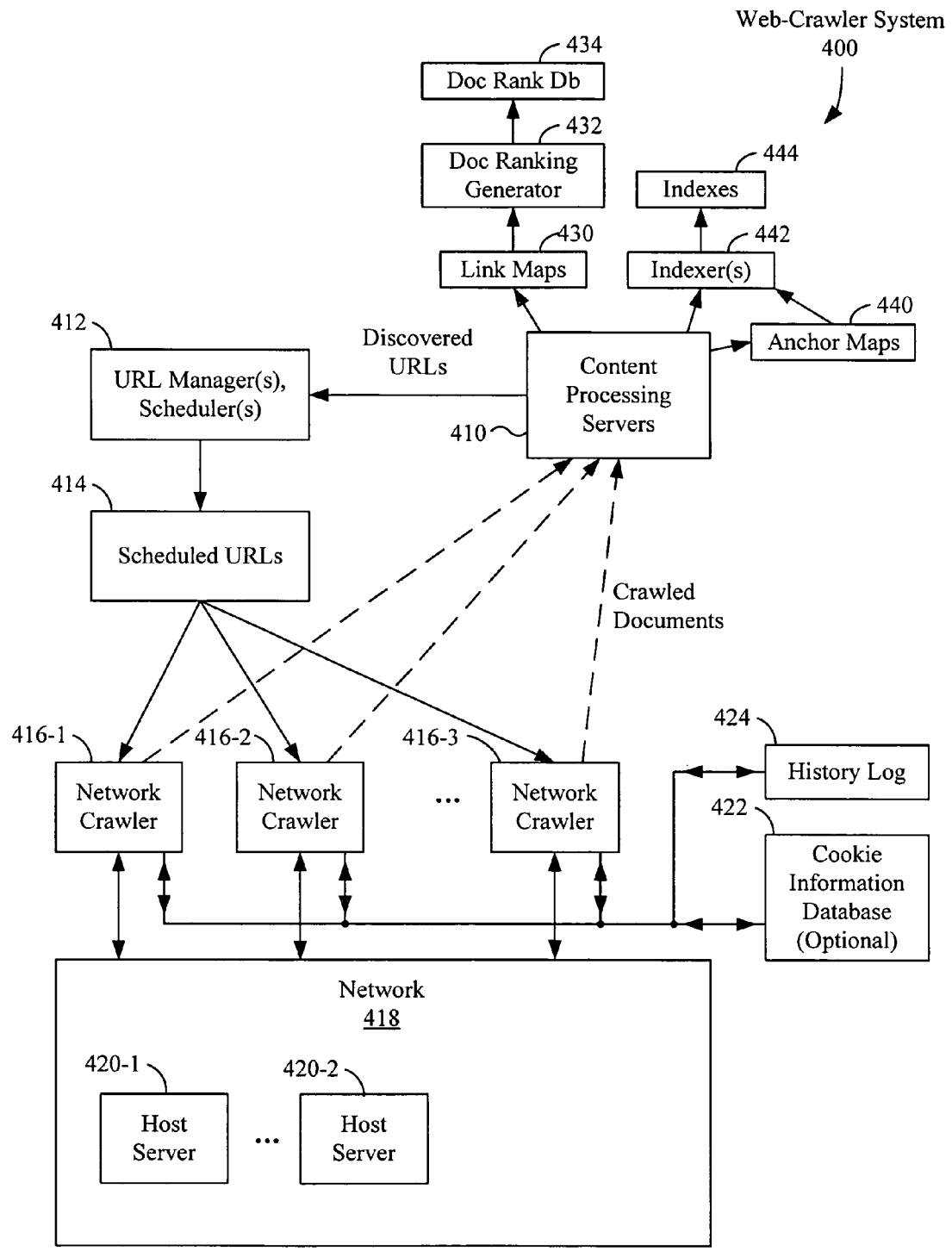
FIG. 4 is a block diagram illustrating an embodiment of a web crawler system.

Attention is now given to hardware and systems that may utilize and/or implement the improved link tags and the embodiments 200, 250, 280 and 300 of the methods discussed above. FIG. 4 illustrates an embodiment of a web-crawler system 400 that may utilize the improved link tags. Content processing servers 410 inspect web pages and other documents downloaded by a plurality of network crawlers 416 to identify new or previously known URLs, or other addresses, of documents to be crawled by a set of network crawlers 416. Network crawlers 416 are also called web crawlers. The URLs may correspond to locations within host servers 420 containing, for example, web sites, on a network 418. Alternatively, the URLs may correspond to locations within host servers 420 containing documents on the network 418, such as a document database. URL managers and schedulers 412 determine which URLs (herein called the scheduled URLs 414) to schedule for crawling by the plurality of network crawlers 416. In this context, "scheduling" a document for crawling may mean including the document's URL, address or identifier in a list of documents to be crawled. The network crawlers 416 access and download documents, such as web pages and other types of documents, from the host servers 420 on the network 418.

The network 418 may be the Internet, a portion of the Internet, an Intranet or portion there of, or a specified combination of Intranet(s) and/or host servers on the Internet. The documents and web pages stored by the host servers 420 contain links to other documents or web pages. Conceptually, the network crawlers 416 are programs that automatically traverse the network's hypertext structure. In practice, the network crawlers 416 may run on separate computers or servers. For convenience, the network crawlers 416 may be thought of as a set of computers, each of which is configured to execute one or more processes or threads that download documents identified by the scheduled URLs 414.

The network crawlers 416 receive the assigned URLs and download (or at least attempt to download) the documents at those URLs. The network crawlers 416 may also retrieve documents that are referenced by the retrieved documents. The network crawlers 416 pass the retrieved documents to the content processing servers 410, which process the links in the downloaded pages, from which the URL managers and schedulers 412 determine which pages are to be crawled. An optional history log 424 stores log records that indicate the URLs visited.

Network crawlers 416 use various protocols to download pages associated with URLs, such as HTTP, HTTPS, gopher and File Transfer Protocol. In addition, in some embodiments the network crawlers 416 are capable of communicating with web sites that use cookies. Cookies may be stored in optional cookie information database 422.

The content processing servers 410 may utilize one or more of the improved link tags in one or more retrieved documents to select processing of content and/or documents. The selected processing may include changing of the weights and/or ranking values in a document index corresponding to one or more content locations and/or document locations associated with one or more of the link tags. The selected processing may also include blocking processing of content and/or documents associated with one or more link tags. The URL manager(s) and schedulers 412 may exclude content locations and/or documents locations corresponding to blocked content and/or documents from the scheduled URLs 414.

The content processors 410 output, among other things, link maps 430 that represent links between the documents known to the web crawler system 400. The documents known to the web crawler system 400 may include documents that have not been crawled, but which are referenced by links in documents that have been crawled. The link maps 430 are used by one or more a document ranking generators (also called page rankers) 432 to determine or adjust the page importance scores (e.g., PageRank values) of the documents known to the web crawler system URLs. The page importance scores may be stored in a document rank database 434 or other data structure or set of data structures that logically form a database.

In some embodiments, the content processors 410 also output anchor maps 440, which represent the anchor text found in the links in the crawled documents and target documents (i.e., the locations specified by the links that contain the anchor text) that correspond to the anchor text. The anchor maps 440 are used by indexers 442 to index "anchor text." Anchor text indexing can be used to locate documents that do not contain words. The indexing of anchor text is described more fully in U.S. patent application Ser. No. 10/614,113, filed Jul. 3, 2003. The indexers 442 also index document content, and produce a set of indexes (also called indices) 444 that are used by a search engine when responding to search queries.

Figure 5:
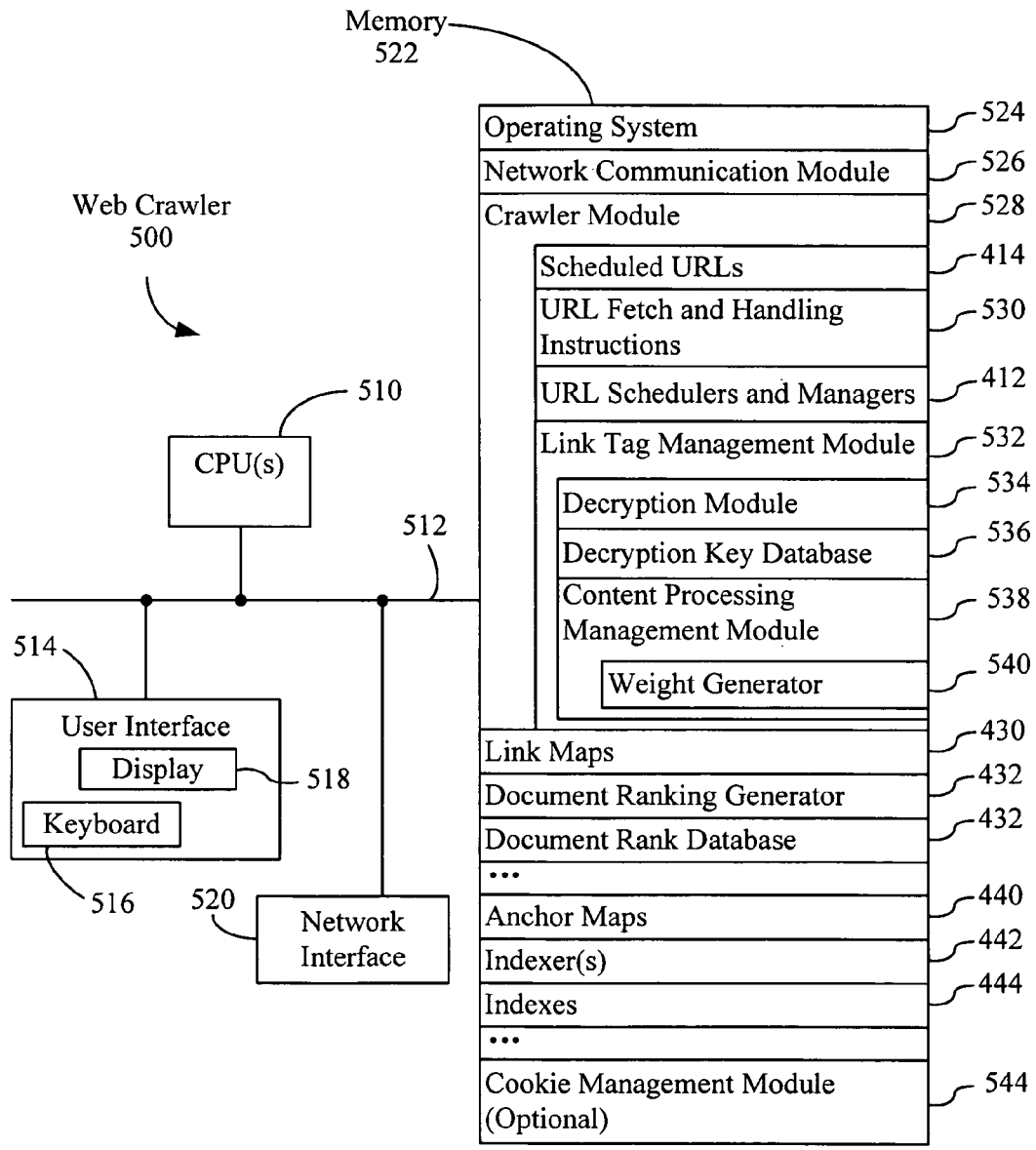
FIG. 5 is a block diagram illustrating an embodiment of a web crawler.

FIG. 5 illustrates an embodiment of a web crawler 500, such as network crawler 416-1 (FIG. 4). The web crawler 500 includes one or more central processing units 510, one or more network interfaces 520, memory 522, all of which are interconnected by one or more communication buses or signal lines 512. An optional user interface 514 may include one or more keyboards 516 and/or one or more displays 518. The one or more network interfaces 520 enable communications with host servers 420 (FIG. 4) that host (i.e., store and/or provide access to) the scheduled URLs 414 (FIG. 4), and content processing servers 410 (FIG. 4). In some embodiments, the network interfaces 520 may also provide access to one or more servers containing the optional history log 424 and one or more servers containing the optional cookie information database 422.

Memory 522 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 522 may optionally include one or more storage devices remotely located from the central processing unit(s) 510.

Memory 522 may store an operating system 524 that includes procedures (or a set of instructions) for handling various basic system services and for performing hardware dependent tasks, a network communications module 526 (or a set of instructions) for controlling communications via the one or more network interfaces 520 and a crawler module 528 (or a set of instructions). The crawler module 528 includes a set of scheduled URLs 414 to be crawled, URL fetch and handling instructions 530, URL schedulers and managers 412, a link tag management module 532, a document ranking generator 542 and an optional cookie management module 544. The link tag management module 532 includes a decryption module 534 for decrypting at least a portion of the link tag information, a decryption key database 536 for various publishers and a content processing management module 538. The content processing management module 538 includes weight generator 540 for setting or adjusting the weights associated with links to respective documents.

Figure 6:
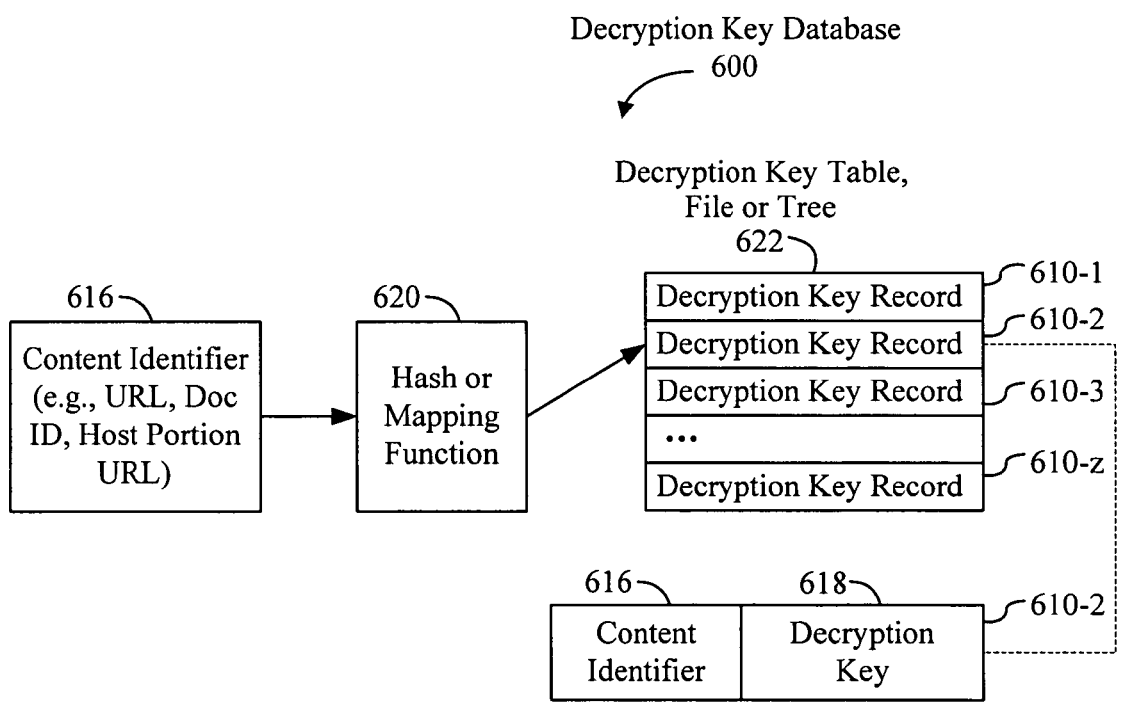
FIG. 6 is a block diagram illustrating an embodiment of a decryption key database.

FIG. 6 illustrates an embodiment of a decryption key database 600, such as the decryption key database 536 (FIG. 5). The decryption key database 600 includes multiple entries 610, herein also called decryption key records, each of which stores a decryption key associated with a content identifier 616. The content identifier 616 may be a URL; a partial URL identifying a web site, a set of web sites or a portion of a web site; a document identifier; or a publisher identifier. In those embodiments where at least a portion of one or more of the information tags is encrypted, the decryption key database may contain the requisite information used by the web crawler 500 (FIG. 5) or the web-crawler system 400 (FIG. 4) to decrypt the information. Entries 610 may correspond to different publishers of content or documents. In an exemplary embodiment, an operator of a web-crawler system, such as the web-crawler system 400 (FIG. 4), may provide publishers with encryption keys to use, if desired, with at least a portion of the information in improved link tags embedded in the content and/or documents produced by the publishers. The content identifier 616 is converted into a database index by a hash or mapping function 620. The resulting database index is then used to locate a decryption key record 616 in a decryption key table, file or tree data structure 622, for instance by using a hash lookup methodology.

Figure 7:
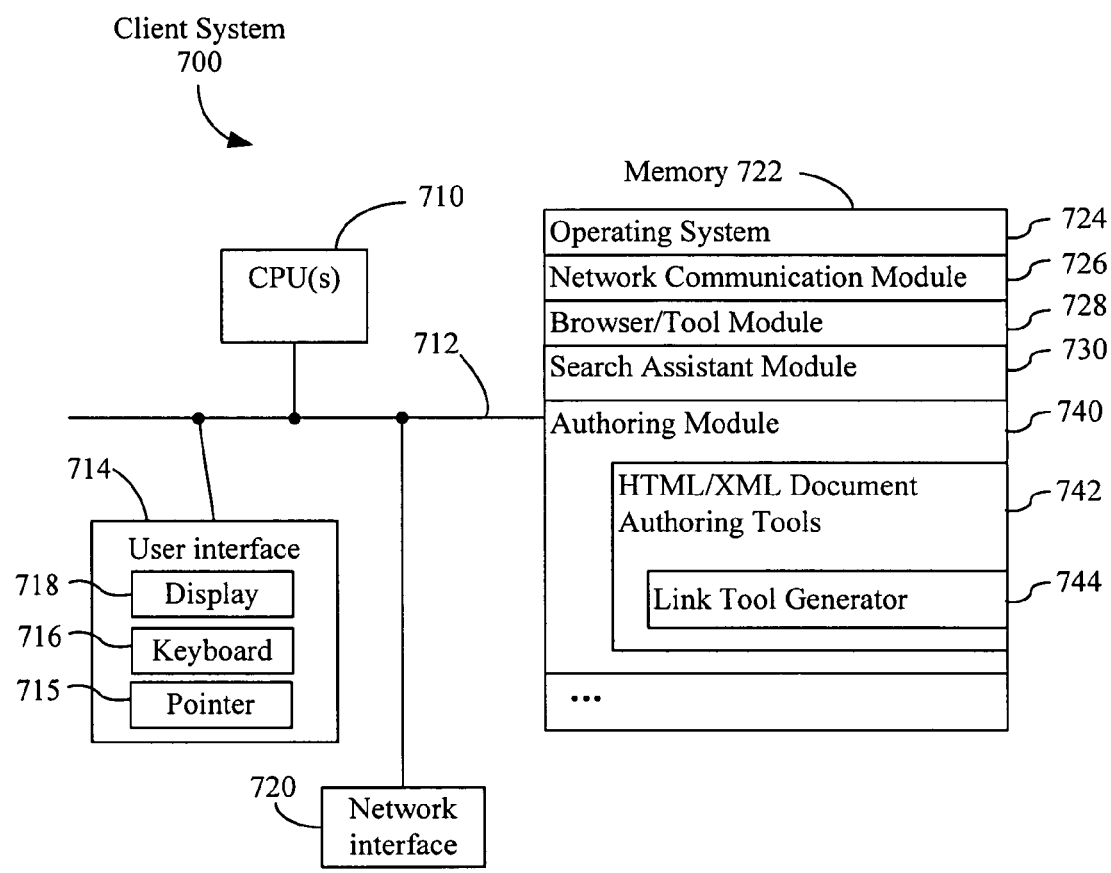
FIG. 7 is a block diagram illustrating an embodiment of a client system.

FIG. 7 illustrates a block diagram of an embodiment of a client system 700. The client system 700 may include at least one data processor or central processing unit (CPU) 710, one or more user interfaces 714, a communications or network interface 720 for communicating with other computers, servers and/or clients, memory 722 and one or more communication busses or signal lines 712 for coupling these components to one another. The user interface 714 may have one or more pointer devices 715 (e.g., mouse, trackball, touchpad or touch screen), keyboards 716 and/or one or more displays 718.

Memory 722 may include high-speed random access memory, such as DRAM, SRAM, DDR RAM or other random access solid state memory devices; and/or non-volatile memory, such as one or more magnetic disk storage devices, optical disk storage devices, flash memory devices, or other non-volatile solid state storage devices. Memory 722 may store an operating system 724, such as LINUX, UNIX or WINDOWS, that includes procedures (or a set of instructions) for handling basic system services and for performing hardware dependent tasks. The memory 722 may also store communication procedures (or a set of instructions) in a network communication module 726. The communication procedures are used for communicating with a search engine.

The memory may also include a browser or browser tool module 728 (or a set of instructions), a search assistant module 730 (or a set of instructions) and an authoring module 740 (or a set of instructions). The search assistant module 730 may be implemented using executable code such as JavaScript which may be included in a search portal web page or a page of search results, as a plug-in application program attached to browser or browser tool 728, or a stand-alone application. The search assistant module 730 may include instructions for assisting or monitoring user entry of a search query, for sending a search query to a search engine, and/or for receiving and displaying search results. The authoring module 740 may include HTML/XML document authoring tools 742. The HTML/XML document authoring tools 742 may include a link tool generator 744 for generating the improved link tags. The HTML/XML document authoring tools 742 may include instructions for generating a link tag in a document, the link tag including one or more information pairs, as described above, and instructions for embedding the link tag in the document.

In embodiments where the client system 700 is coupled to a local server computer, one or more of the modules and/or applications in the memory 722 may be stored in a server computer at a different location than the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 722 may include additional modules and/or sub-modules, or fewer modules and/or sub-modules. For example, the search assistant module 730 may be integrated into the browser/tool module 728. Memory 722, therefore, may include a subset or a superset of the above identified modules and/or sub-modules.

Figure 8:
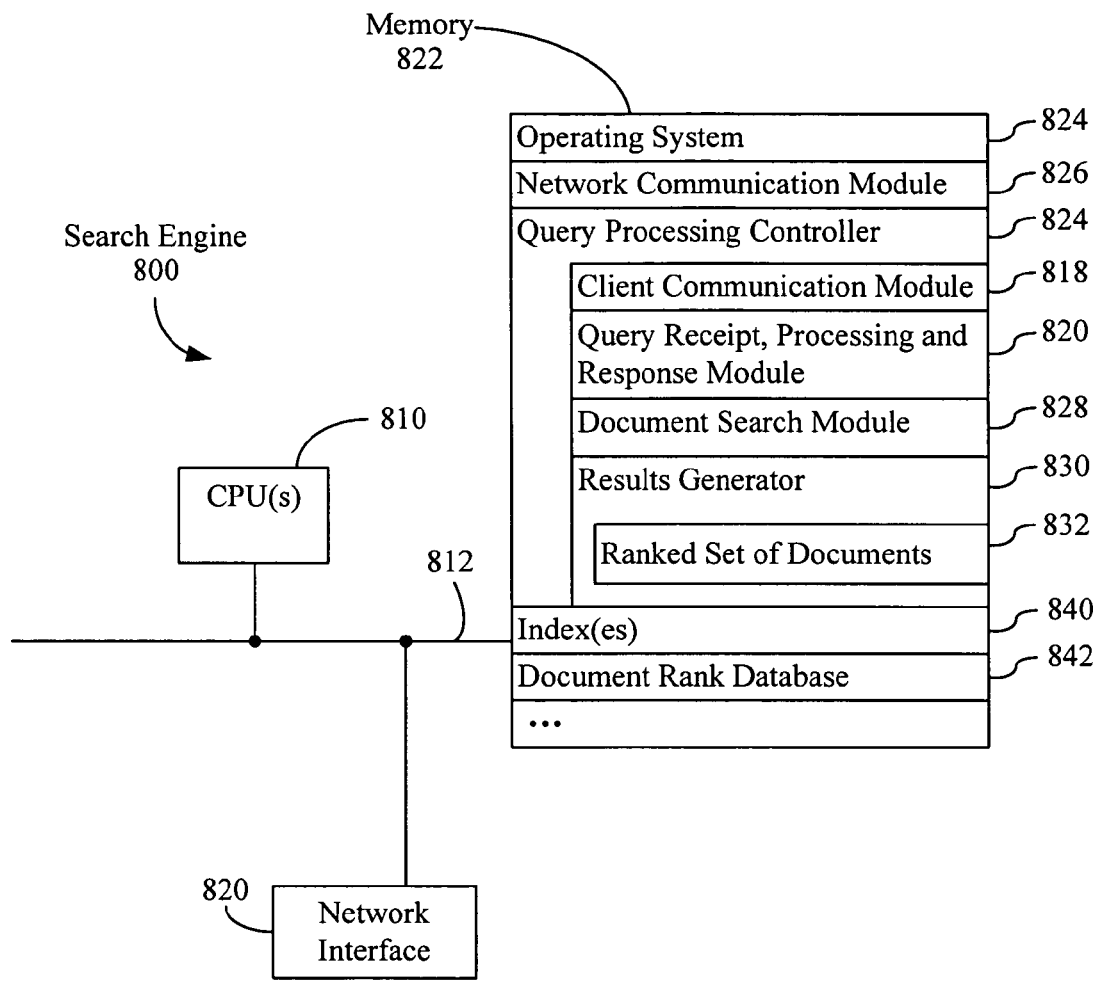
FIG. 8 is a block diagram illustrating an embodiment of a search engine system.

FIG. 8 is block diagram illustrating an embodiment of a search engine 800. The search engine 800 may include at least one data processor or central processing unit (CPU) 810, a communications or network interface 820 for communicating with other computers, servers and/or clients, memory 822 and one or more communication busses or signal lines 812 for coupling these components to one another.

Memory 822 may include high-speed random access memory, such as DRAM, SRAM, DDR RAM or other random access solid state memory devices; and/or non-volatile memory, such as one or more magnetic disk storage devices, optical disk storage devices, flash memory devices, or other non-volatile solid state storage devices. Memory 822 may store an operating system 824, such as LINUX, UNIX or WINDOWS, that includes procedures (or a set of instructions) for handling basic system services and for performing hardware dependent tasks. Memory 822 may also store communication procedures (or a set of instructions) in a network communication module 826. The communication procedures are used for communicating with clients computers or devices (e.g., client submitting search queries), and with other servers and computers in the search engine 800.

Memory 822 may also store a query processing controller 824 (or a set of instructions). The query processing controller 824 may include the following elements, or a subset or superset of such elements: a client communication module 818, a query receipt, processing and response module 820, a document search module 828 and a results generator 830. The results generator 830 may produce a ranked set of documents 832. The ranked set of documents 832 may be generated using the information in the improved link tags, thereby allowing search results to reflect additional information, such as relative importance or weights, provided by content and/or document publishers.

Although FIG. 8 shows search engine 800 as a number of discrete items, FIG. 8 is intended more as a functional description of the various features which may be present in a search engine system rather than as a structural schematic of the embodiments described herein. In practice, and as recognized by those of ordinary skill in the art, the functions of the search engine 800 may be distributed over a large number of servers or computers, with various groups of the servers performing particular subsets of those functions. Items shown separately in FIG. 8 could be combined and some items could be separated. For example, some items shown separately in FIG. 8 could be implemented on single servers and single items could be implemented by one or more servers. The actual number of servers in a search engine system and how features, such as the query processing controller 824, are allocated among them will vary from one implementation to another, and may depend in part on the amount of information stored by the system and/or the amount data traffic that the system must handle during peak usage periods as well as during average usage periods.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of processing documents, comprising:
   receiving a document in a search engine crawler, the document having a first link tag embedded in the document, the first link tag including a location value and one or more information pairs that are distinct from the location value, wherein a respective information pair has a respective parameter and a corresponding parameter value;
   selecting a method of processing content, wherein the content is specified by the location value of the first link tag and the selected method of processing is in accordance with one or more of the one or more information pairs of the first link tag;
   retrieving the content specified by the location value of the first link tag; and
   processing the retrieved content specified by the first link tag in accordance with the selected method to add information to one or more databases used by a search engine.

2. The method of claim 1, wherein an information pair of the one or more information pairs included in the first link tag is included in a second tag that includes the first link tag, the second tag includes a second information pair having a respective parameter and a corresponding second parameter value, and the selected method of processing content is performed on the content specified by the location value of the first link tag in accordance with the second parameter value.

3. The method of claim 1, wherein the method of processing the retrieved content includes adjusting a weight specified by a respective information pair of the first link tag.

4. The method of claim 3, further comprising computing one or more document ranking values for one or more document locations, wherein the computing is performed in accordance with the weight specified by the first link tag.

5. The method of claim 1, wherein the link tag specifies one or more content locations and further comprising computing one or more document ranking values for the one or more content locations in accordance with a weight specified by a respective information pair of the first link tag.

6. The method of claim 1, wherein parameters in the one or more information pairs correspond to content at one or more content locations.

7. The method of claim 1, further comprising retrieving a respective decryption key associated with a respective publisher, including looking up the respective decryption key in a data structure in accordance with a location of the received document.

8. The method of claim 1, further comprising retrieving a respective decryption key associated with a respective publisher, including looking up the respective decryption key in a data structure in accordance with an identifier of the received document.

9. The method of claim 1, wherein the first link tag is HTML compatible.

10. The method of claim 1, wherein the first link tag is XML compatible.

11. The method of claim 1, wherein one or more of the parameter values in the one or more information pairs are encrypted.

12. The method of claim 11, wherein the one or more encrypted values are encrypted using a key from a non-symmetric key pair.

13. A computer-program product, comprising:
a computer readable storage medium storing one or more programs to be executed by a computer system, the one or more programs comprising:
web crawling instructions to identify a set of documents to be retrieved and processed,
wherein a document of the set of documents has an embedded first link tag, the first link tag including a location value and one or more information pairs that are distinct from the location value, a respective information pair having a respective parameter and a corresponding parameter value, and
instructions to process content specified by the first link tag, including instructions to select a method of processing the content, wherein the content is specified by the location value of the first link tag and the selected method of processing is in accordance with one or more of the one or more information pairs of the first link tag, and instructions to process the content in accordance with the selected method to add information to one or more databases used by a search engine.

14. A computer, comprising:
memory;
one or more processors; and
one or more programs, stored in the memory and executed by the one or more processors, the one or more programs including:
web crawling instructions to identify a set of documents to be retrieved and processed,
wherein at least one document has an embedded first link tag, the first link tag including a location value and one or more information pairs that are distinct from the location value, a respective information pair having a respective parameter and a corresponding parameter value, and
instructions to process content specified by the first link tag, including instructions to select a method of processing the content, wherein the content is specified by the location value of the first link tag and the selected method of processing is in accordance with one or more of the one or more information pairs of the first link tag, and instructions to process the content in accordance with the selected method to add information to one or more databases used by a search engine.

15. A computer-program product, comprising:
a computer readable storage medium storing one or more programs to be executed by a computer system, the one or more programs comprising:
instructions to generate a link tag in a document, the link tag including a location value and one or more information pairs that are distinct from the location value, wherein a respective information pair has a respective parameter and a corresponding parameter value; and
instructions to embed the link tag in the document;
wherein the value in the embedded link tag specifies a method of processing content by a web crawler so as to modify information, associated with the content, that is being added to one or more databases used by a search engine, wherein the content to be processed is specified by the location value of the embedded link tag and the method of processing is in accordance with the respective parameter value in one or more of the one or more information pairs of the embedded link tag.

16. The computer-program product of claim 15, wherein an information pair of the one or more information pairs included in the embedded link tag is included in a second tag that includes the embedded link tag, the second tag includes a second information pair having a respective parameter and a corresponding second parameter value, and the selected method of processing content is performed on the content specified by the location value of the embedded link tag in accordance with the second parameter value.

17. The computer-program product of claim 15, wherein the method of processing content includes adjusting a weight specified by a respective information pair of the embedded link tag.

18. The computer-program product of claim 13, wherein an information pair of the one or more information pairs included in the first link tag is included in a second tag that includes the first link tag, the second tag includes a second information pair having a respective parameter and a corresponding second parameter value, and the selected method of processing content is performed on the content specified by the location value of the first link tag in accordance with the second parameter value.

19. The computer-program product of claim 13, wherein the method of processing the retrieved content includes adjusting a weight specified by a respective information pair of the first link tag.

20. The computer of claim 14, wherein an information pair of the one or more information pairs included in the first link tag is included in a second tag that includes the first link tag, the second tag includes a second information pair having a respective parameter and a corresponding second parameter value, and the selected method of processing content is performed on the content specified by the location value of the first link tag in accordance with the second parameter value.

21. The computer of claim 14, wherein the method of processing the retrieved content includes adjusting a weight specified by a respective information pair of the first link tag.

* * * * *